United States Patent [19]

Rothschild

[11] 3,712,401

[45] Jan. 23, 1973

[54] SAFETY BELT SYSTEM FOR MOTOR VEHICLES

[76] Inventor: Barbara G. Rothschild, 2134 Springdale Road, Columbus, Ga. 31906

[22] Filed: Jan. 20, 1971

[21] Appl. No.: 108,075

[52] U.S. Cl.............180/82, 280/150 SB, 297/385
[51] Int. Cl...............................B60r 21/10
[58] Field of Search....180/82; 280/150 SB; 297/384, 297/385, 388, 390

[56] References Cited

UNITED STATES PATENTS

| | | | |
|---|---|---|---|
| 3,190,694 | 6/1965 | Isaac | 297/388 |
| 3,391,961 | 7/1968 | Gardner et al. | 280/150 SB X |
| 3,414,326 | 12/1968 | Raffaelli | 280/150 SB X |
| 3,343,623 | 9/1967 | Porter | 280/150 SB X |
| 3,436,094 | 4/1969 | McKeon | 180/82 X |
| 3,613,819 | 10/1971 | Maloney | 280/150 SB |
| 3,653,714 | 4/1972 | Gentile | 297/385 |

Primary Examiner—Kenneth H. Betts
Attorney—Kimmel, Crowell & Weaver

[57] ABSTRACT

A vehicular seat belt system has a body encircling, arcuate rod of semi-rigid form positioned across a seat in a position such that the seat cannot be occupied without first manually displacing the rod. The rod is hinged at one end and is biased so as to automatically move toward its closed position when released after seat occupancy. The rod is provided with securing means at its other end, the securing means including an automatic adjustment function.

10 Claims, 8 Drawing Figures

PATENTED JAN 23 1973

INVENTOR
BARBARA G. ROTHSCHILD
BY
Kimmel, Crowell & Weaver
ATTORNEYS

3,712,401
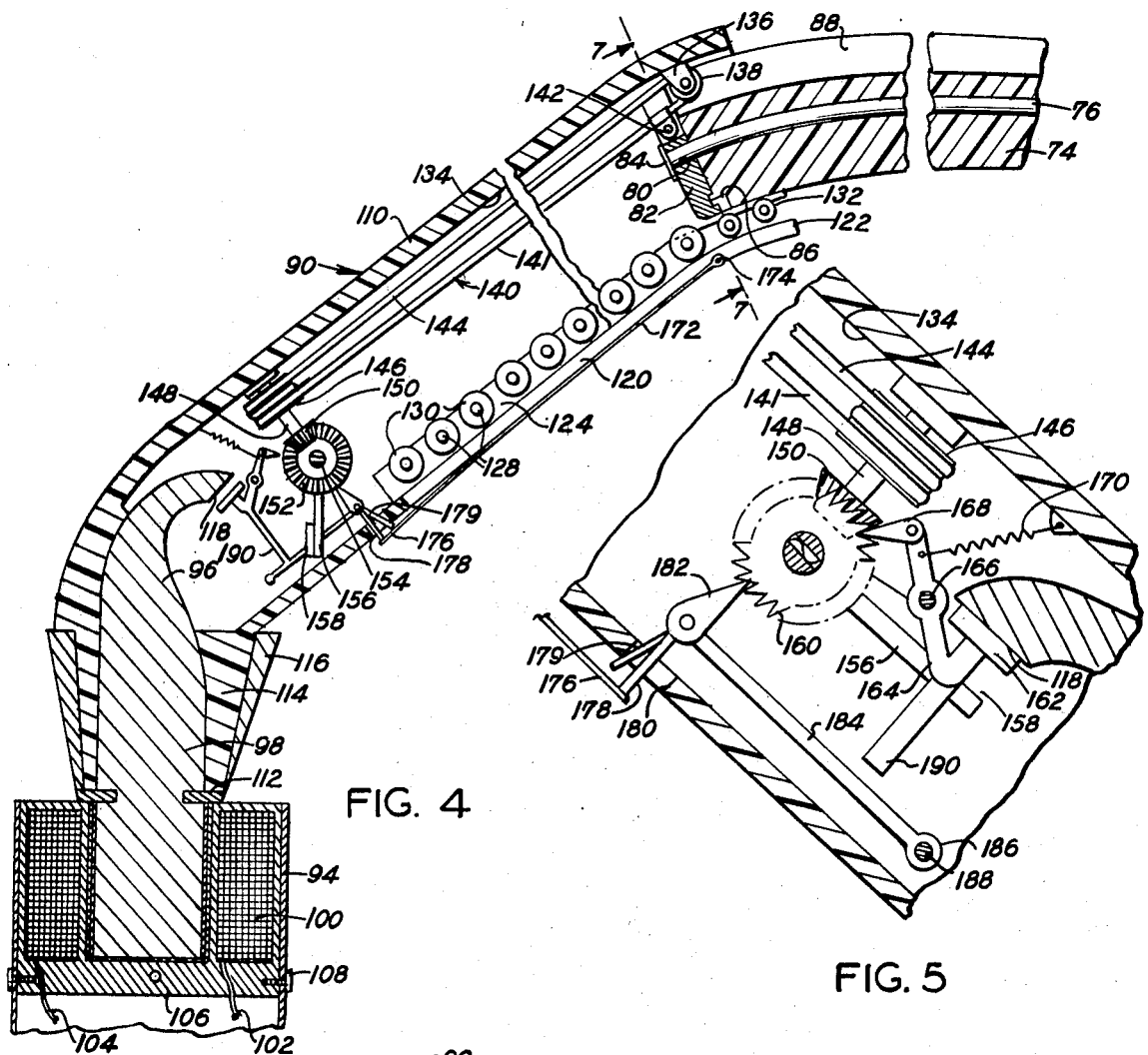
FIG. 4
FIG. 5
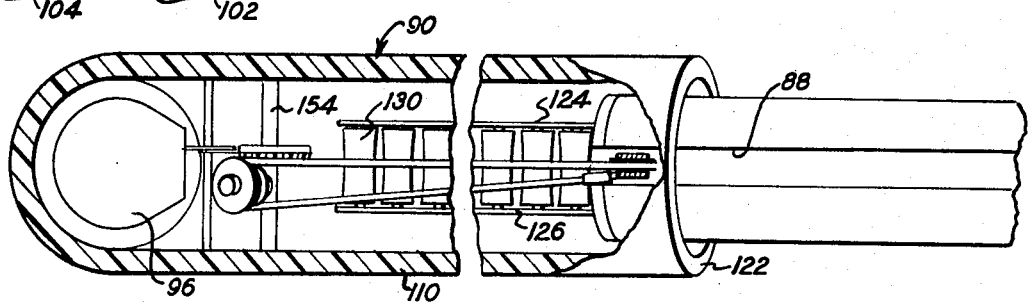
FIG. 6
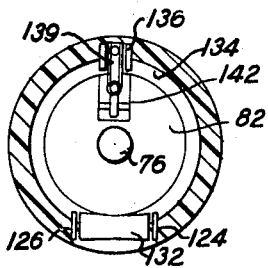
FIG. 7
INVENTOR
BARBARA G. ROTHSCHILD
BY
Kimmel, Crowell & Weaver
ATTORNEYS

SAFETY BELT SYSTEM FOR MOTOR VEHICLES

CROSS-REFERENCE TO RELATED APPLICATIONS

Applicant has previously filed two related applications, the first being entitled SAFETY SEAT BELT, Ser. No. 36,592, filed May 12, 1970, now abandoned; and the second being entitled AUTOMATIC SAFETY SEAT BELT, bearing Ser. No. 59,298, and which was filed on July 29, 1970, now U.S. Pat. No. 3,637,259.

BACKGROUND OF THE INVENTION

1. Field of the Invention

This invention pertains to vehicular seat belt systems, and to adjustment means for such systems.

2. Statement of the Prior Art

There is no question that the public has long been aware of the fact that serious physical injury and even death often occur upon the collision of two or more vehicles, or upon the collision of vehicles with stationary objects. The Federal Government, through the Department of Transportation, and most of the individual states, have now enacted laws requiring the provision of seat belts and/or other restraining devices as standard equipment for passenger vehicles. Despite the fact that body restraining devices are known to reduce potential physical injury upon a collision between two or more vehicles, public apathy in the utilization of such mechanisms is widespread and is also of common knowledge.

There are a number of reasons which may be offered for the lack of widespread use of seat belts, among which might be mentioned the fact that most are uncomfortable until the user becomes accustomed to the restraint. Again, many vehicle passengers "forget" to use such safety means, and this is generally occasioned by the fact that the safety means is not immediately visible or is not readily accessible. The latter is particularly true with respect to the conventional two-piece safety belts which are ordinarily found installed in most automotive vehicles. It is the common practice, now, to reel up and fixedly connect one end of a two-piece safety belt to the floor of a vehicle while the other piece thereof may be positioned on the car seat, behind the car seat, or in some other more or less inaccessible position making it necessary for the vehicle passenger to hunt or trace out the second piece of the two belt construction. This can lead to some frustration and ultimately to the disregard of the safety belt and its usage.

One of the primary disadvantages of conventional vehicle safety belts or restraints resides in the fact that none requires manual manipulation before a vehicle passenger may take his seat. It is believed that the conscious manipulation of such equipment will eventually result in training in order that the use of a seat belt or other restraining member will become a matter of, substantially, a subconscious action.

The prior art does disclose earlier attempts to provide safety belts, guards or restraining means which do require passenger manipulation before a seat may be occupied. Such references have been set forth in my earlier filed patent application, Ser. No. 36,592, specific mention having been made to the U.S. Pats. to Oppenheim, No. 2,858,144, to Presunka, No. 3,198,544, and to Paes, No. 3,453,026. None of these is believed to be germane to the instant invention, however, since they do not teach the provision of seat belts or restraining devices having the necessary flexibility, adjustability, and suitable anchoring means for acceptance in modern day vehicle construction.

SUMMARY OF THE INVENTION

This invention pertains to the provision of a safety seat belt system or passive restraining means for the occupant of a vehicle seat, and wherein the seat belt or passive restraint must be manually displaced from a transverse position across the seat before a passenger may occupy the seat. The invention further contemplates the construction of such a safety device or belt, wherein the belt is formed of a semi-rigid material to engage about the body of the wearer upon seat occupancy, and means energizable from a vehicle electrical circuit for releasably securing the seat belt in its operative position across the body of the wearer.

More specifically, in the preferred embodiment of this invention, there is provided a reinforced belt formed of a semi-rigid material which is molded in an arcuate rod form with an end thereof anchored by pivotal means at a point adjacent the back edge of a vehicle passenger seat. The other end of the rod, when not in use, curves transversely across the passenger seat and terminates in means partially housing a magnet. A portion of the magnet is adapted to be socketed in an electromagnet anchored on the vehicle and which is energized from a vehicle source of electrical power. Energization of the electromagnet creates an electromagnetic force which, by mechanical means, causes the aforementioned other end of the rod to be drawn into the handle means to tighten across the body of the user in accordance with and to accommodate his girth. Simultaneously with and in response to the generated electromagnetic force, automatically actuated means becomes operable to releasably secure the belt in its adjusted position across the body of the wearer during the time period the electromagnet is energized. Deenergization of the electromagnet deactivates the releasable securing means whereby the belt may be manually moved away from the body of the wearer to enable the passenger to leave the vehicle. Upon departure of the passenger and the manual release of the belt, the belt will, because of its inherent characteristics, extend itself transversely across the vehicle seat in substantially its original previous condition.

Other and further objects and advantages of the present invention will become apparent to those skilled in the art from a consideration of the following specification when read in conjunction with the annexed drawings.

BRIEF DESCRIPTION OF THE DRAWINGS

FIG. 4 is an enlarged medial transverse cross-sectional view taken through the free end of the safety belt and illustrating the same in its operative position relative to the socket anchoring means;

FIG. 5 is an enlarged opposite side elevational view of the releasable securing means in its operative form;

FIG. 6 is a top plan view of the free end portion of the belt illustrated in FIG. 4, FIG. 6 being partially broken away to illustrate components of the belt;

FIG. 7 is a detail transverse cross-sectional view, FIG. 7 being taken substantially on the plane of the line 7—7 of FIG. 4, looking in the direction of the arrows.

DESCRIPTION OF THE PREFERRED EMBODIMENT

Figure 1:
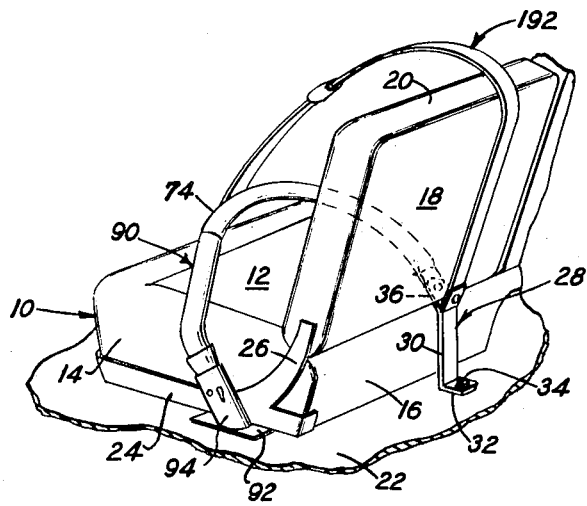
FIG. 1 is a fragmentary perspective view of a vehicle seat illustrating the safety belt of this invention in its operative position.

Referring now more specifically to the drawings, in FIG. 1 reference numeral 10 indicates, in general, a conventional vehicle seat to which the belt system of this invention is applicable. As such, the seat 10 includes a top side 12 to be occupied by the vehicle passenger, an end 14, and a seat back edge 16. The seat 10 also includes a back support member 18 having an upper end 20. Reference numeral 22 denotes the floor of the vehicle to which the seat 10 is connected, by conventional means (not shown), and the reference numerals 24, 26 are indicative of the vehicle seat and seat back adjusting frame members.

Reference numeral 28 indicates first anchoring means for the seat belt to be described below in detail, the anchoring means 28 being formed of any suitable metallic material and having a central normally upright standard 30 which extends vertically across the back edge 16 of the seat 10 and which terminates, at its lower end, in a laterally offset flange 32. The flange 32 makes substantially flush engagement against the floor 22 and is fixedly secured thereto by conventional means such as, for example, a bolt 34. Alternatively, the flange 32 may be secured with the sliding seat means (not shown).

The upper end of the standard 30 terminates in a laterally offset first housing 36 (see FIG. 2) which extends across the top side 12 of the vehicle seat 10 at a medial location.

Figure 2:
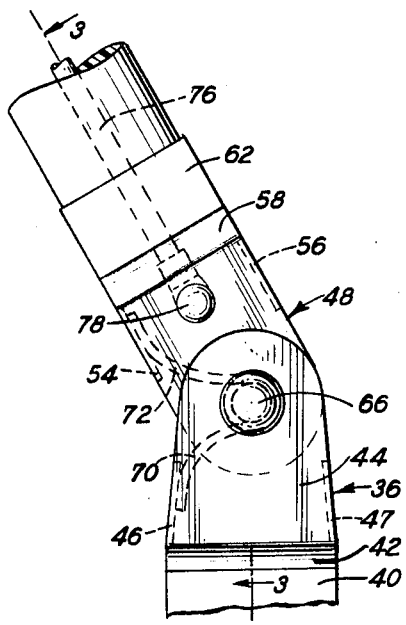
FIG. 2 is an enlarged fragmentary top plan view of the biasing means for the seat belt hereof.

The housing 36 includes an offset end flange 38 (FIG. 3) forming an extension of the standard 30, and superimposed on the offset end flange 38 is a tongue 40 fixedly secured thereto by conventional means (not shown). The tongue 40 continues into a bight 42, the bight 42 being offset from the flange 38, and the bight 42 then continues into an elongated plate 44 disposed in laterally spaced and substantially parallel relationship relative to the outer terminal end of the flange 38. Extending between and fixedly secured to the outer terminal end of flange 38, the bight 42 and the plate 44, is an abutment wall 46 (see FIGS. 2 and 3). As is seen in FIG. 2, the abutment wall 46 terminates intermediate the bight 42 and the outer end of the plate 44. The first housing 36 may also include a housing wall 47 oppositely disposed with respect to the abutment wall 46.

Figure 3:
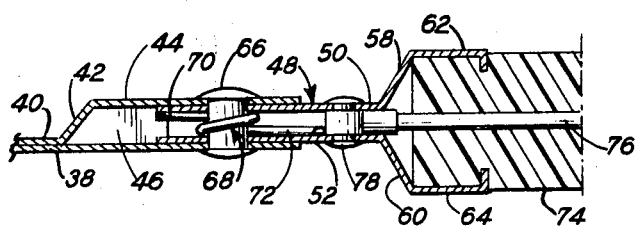
FIG. 3 is a fragmentary detail cross-sectional view of the biasing means, taken substantially on the plane of the line 3—3 of FIG. 2, looking in the direction of the arrows.

A generally rectangular second housing is indicated by reference numeral 48. This housing includes laterally spaced apart substantially parallel top and bottom walls 50, 52, respectively, which are joined by a pair of side walls 54, 56 which are offset at 58, 60 to continue into a pair of generally L-shaped parallel walls 62, 64. As is seen in FIG. 3, the housing 48 is slidably disposed within the open end of the housing 36 and is joined thereto by an upright pivot pin 66 for pivotal movement about the pin axis. A coil spring 68 is mounted on the pin 66 and has a pair of oppositely directed arms 70, 72 which bear, respectively, against the side walls 46 and 54 so as to bias the second housing 48 in such manner that it tends to rotate about the pivot pin 66 counterclockwise, as visualized in FIG. 2.

The safety belt system according to this invention further comprises an elongated arcuate semi-rigid body restraining member 74 which is curved to conform to the waist of the seat passenger and is preferably constructed of a suitable plastic or rubber material. One end of the safety belt or rod 74 is firmly attached to the housing 48 by crimping the L-shaped walls 62, 64 as shown in FIG. 3 of the drawings. Consequently, the rod 74 is pivoted about the axis of the pin 66.

Ideally, the belt 74 is provided with a reinforcing cable 76 having one of its ends fixedly anchored on a pin 78 which extends transversely through the top and bottom walls 50, 52 of the second housing 48. The cable 76 extends substantially coaxially through the safety belt 74.

Referring to FIG. 4, at the other end of the rod 74, the cable 76 is extended through a suitable opening 80 formed in a discoidal end plate 82 which is superimposed against the terminus of the aforementioned other end of the safety belt or rod 74. The cable 76 is held against axial displacement at this end thereof by any conventional means such as, for example, the enlarged head 84. Any suitable means may be provided for securing the plate 82 on the adjacent end of the belt 74 such as by providing the discoidal end plate 82 with a circumferentially extending crimping flange 86. The rod or belt 74 has a slot 88 formed in its upper surface.

The free end of the rod 74 is adapted for adjustable engagement in a socket assembly 90. The assembly 90 is related to the vehicle floor through a mounting means including a mounting plate 92 from which projects a forwardly angled housing 94. Releasably engaged in the housing 94 and projecting therefrom at an operating end 96 is a magnet member 98. The magnet member 98 should be constructed of material having a low residual magnetism. The magnet is electrically attracted by an electromagnet including windings 100 contained within the housing and connected by electrical leads 102, 104 to the vehicle electrical system. The magnet member seats against a bracket 106 with screw-type fasteners 108. As indicated in FIG. 1, manual control means in the form of a switch and indicator light is provided on the housing 94, described below in respect of the vehicle circuit.

A tubular sleeve 110 formed of semi-rigid plastic or similar material extends forwardly from the magnet member 96 and is secured thereabout by mounting lugs 112. As shown in FIG. 4, the sleeve 110 comprises a connecting portion 114 closely engaged about the magnet member, and an offset retaining section to receive the belt 74. A cap 116 aids in retention of the sleeve in place about the magnet member. It is to be noted further in FIG. 4 that the member 96 includes a reverted end 118, serving a function described below.

The sleeve 110 has a longitudinal slot 120 formed to extend inwardly from its distal end 122, and upright walls 124, 126 are positioned on either side thereof. A series of axles 128 span the walls, and a concave roller 130 is rotatably mounted on each axle. It will be observed, again in FIG. 4, that two rollers 132 of reduced diameter are employed in the series adjacent the end 122 of the sleeve. The rollers facilitate the movement of the belt or rod 74 relative to the sleeve.

Depending from the inner wall 134 of the sleeve adjacent the end 122 and diametrically across from the midpoints of the rollers is a bracket 136 with depending side arms. Rotatably mounted between said arms is a first pulley wheel 138 so mounted as to be aligned with slot 88 in the belt 74. A cable 140 is trained about the wheel and is fixed at its lower flight 141 to a clamp 142 secured to the plate 82 of the belt in such fashion that retraction of the said lower flight draws the belt 74 into the sleeve, while opposite movement permits the belt to be moved in an opposite direction. The upper flight 144 of the cable comprises a continuation of the same, the cable being wound about a compound wheel 146 rotatably mounted on a stub shaft 148 depending from the inner wall 134. The shaft has a bevel gear 150 on its outer end meshed with a ring gear 152 on a transverse axle 154. The axle 154 also carries, on an extended arm 156, a magnetically attractable weight 158.

The magnet member 96 is actuated by the energization of the windings 100 connected in the vehicle electrical system. Thus, upon turning of the ignition switch in the electrical system to the "on" position, the member 98 is activated to attract the weight 158 to the end 118 thereof - the pole area of the magnet. Movement of the weight and its arm 156 rotates the ring gear 152 and draws the lower flight 141 of the cable inwardly, thereby adjusting the belt about the body of the wearer.

Means is provided to prevent loosening of the belt under impact and also to prevent undesirable tightening of the belt past a location of comfort and convenience. To these ends, the gear wheel 152 is provided, on one side thereof, with ratchet teeth 160. A magnetically attracted weight member 162 is fixed on a rocker arm 164 in such manner that it is also attracted to the pole 118 of the magnet 96 when the latter is activated. The rocker arm is pivoted on an arm 166 extending from the sleeve wall, and has a pawl 168 on its other end which engages the teeth to prevent any continuing motion of the gears so long as the weight 162 is attracted to the magnet 96 - that is, while the vehicle ignition is in the "on" position. The pawl is otherwise held out of such engagement by the gravitational force of the weight 162 and by a spring 170 suitably anchored to the wall 134. The force of the spring 170 and weight 162 is such that its bias will be overcome by the attraction of the magnet.

Undue tightening of the belt is also prevented by the ratchet. As shown in FIG. 4, a spring like sensor 172 formed of spring steel encased in plastic extends through the longitudinal slot 120 of the sleeve and is fixed therein at its end 174. The opposite end 176 of the sensor carries a perpendicular push rod 178 having a wedge spring 179 which projects into the sleeve through an opening 180. A second pawl 182 is secured to the push arm, as is an elongated operating rod 184 which has its outer end 186 pivoted on a rod 188 from the sleeve wall. When the belt tightens about a wearer to an extent such that the sensor 172 is pushed upwardly, the second pawl 182 is forced into position to lock the gear wheel against further rotation and therefore to stop the belt tightening procedure. Wedge spring 179 will prevent inadvertent withdrawal of the pawl, such as in instances where the person inhales. Disengagement of the second pawl is accomplished upon deenergization of the system through mechanical means, such as a lug 190 of elongated form secured to the rocker arm 164 and aligned with the operating rod 184. When the arm is released from magnetic attraction, the spring 170 moves the lug against the rod 184, thereby disengaging the pawl 182 from the ratchet.

As in the case of the inventions described in the aforesaid earlier applications, the system of the present invention includes effective shoulder harness means 192. The harness may be of any approved type for automotive passenger use, and the details of the construction thereof are not here at issue. However, the adjustment would preferably include an inertia reel. The shoulder harness 192 is attached to the seat belt at a point to the left of the center of the belt and as the seat belt is adjusted or closed, the shoulder harness will follow in extending across the shoulder, chest and abdomen of the seat occupant.

In the event that future requirements render it necessary that the seat belt remain in an open position when not in use, the hinge means may be redesigned in such way as to be counterbalanced. In such instance, when an occupant then occupies the seat, his weight would exert a downward force on the seat and belt that would throw the hinge off its balanced position with the belt then swinging into its closed position.

Figure 8:
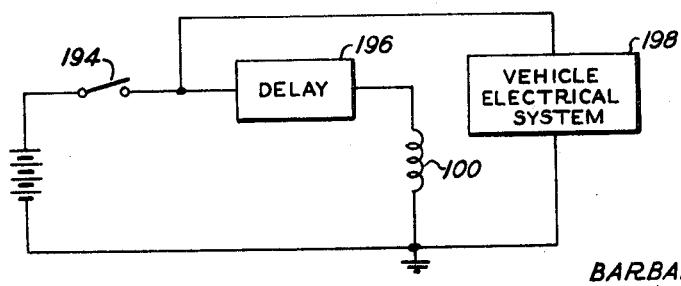
FIG. 8 is a schematic wiring diagram of a typical circuit for energizing solenoid anchoring means according to this invention.

Reference is made to FIG. 8, showing a typical wiring diagram hereof, wherein the vehicle ignition switch is identified by reference numeral 194. Suitable delay means 196 are incorporated in a circuit to control the coil or winding 100, which is connected in parallel with the conventional vehicle power system 198. This provides a timer in the vehicle circuit to permit a user to temporarily deactivate the circuit, as when momentary departure from the vehicle is desired, and which will automatically activate the circuit again to its locked position after a preselected time lapse. Manual means (not shown) are provided for activating the timer when deactivation of the circuit is desired. The details of the latter are also outside the scope of the present disclosure.

Summarizing the operation of the seat belt system, when the vehicle ignition is off and the vehicle seat is unoccupied, the seat belt formed by the rod 74 and the socket assembly 90 is resiliently urged across the seat 10 by the spring 68 to a position wherein the magnet member 98 is seated within the housing 94, as indicated in FIGS. 1 and 4. The person entering the vehicle will manually swing the seat belt about the axis of the pin 66 (clockwise in FIG. 2) with the magnet member 98 leaving the housing 94 to provide clearance for the person to sit down on the seat 10. The seat belt is then released to resume its FIGS. 1 and 4 position under the influence of the spring 68. Up to this point, the seat belt operates similarly to the seat belt in my aforementioned application Ser. No. 59,298.

The closing of the ignition switch 194 by the occupant of the vehicle energizes the electromagnet windings 100 to thereby magnetically attract the magnet member 98 and thus perform the function of a latch means in restraining the belt against opening movement from the FIGS. 1 and 4 position.

The energization of the electromagnet windings 100, by magnetizing the magnet member 98, causes the weight 158 to swing towards the magnet member end 118 to thereby cause the lower flight 141 of the pulley 140 to move leftwardly (FIG. 4) to move the rod 74 leftwardly into the socket member 90 to thus automatically contract the seat belt about the occupant when the seat belt is latched by the electromagnet windings 100. The degree of contraction of the seat belt and the extent of movement of the weight 158 towards the magnet member end 118 will depend on the girth of the occupant.

The magnetization of the magnet member 98 also causes the weight 162 to move against the magnet member end 118 to thus cause the pawl 168 to engage the ratchet teeth 160. The pawl 168 and the ratchet teeth 160 are so constructed, as seen in FIG. 5, that the pawl will permit counterclockwise movement (FIG. 5) but will prevent clockwise movement of the ratchet teeth 160 and thus of the ring gear 152. The engagement of the pawl 168 with the ratchet teeth 160 thus permits contraction of the belt to take place while precluding expansion thereof.

When the belt has contracted to such an extent as to cause the sensor 172 to engage the occupant, the pawl 182 is pushed inwardly against the ratchet teeth 160 to thereby positively lock the ratchet teeth on the gear wheel 152 against further rotation to thus deactivate the mechanism for effecting automatic contraction of the seat. At this time, the spacing of the weight 158 from the magnet member end 118 will depend on the contracted position of the seat belt which in turn will depend on the girth of the seat occupant.

When the ignition switch 194 is opened, the electromagnet windings 100 are deenergized to release the latch formed between the magnet member 96 and the electromagnet and to also cause the magnet member 96 to be demagnetized. The occupant may now swing the seat belt away from him about the pin 66 and leave the vehicle. The movement of the seat belt away from the occupant enables the spring sensor 172 to release the pawl 182 from the ratchet teeth 160 under the influence of the lug 190 which is moved against the rod 184 in response to the demagnetization of the magnet member 96. This demagnetization also releases the pawl 168 from the ratchet teeth 160 and causes the weight 158 to return to its idle FIG. 4 position so that the lower flight 141 of the cable 140 is moved rightwardly (FIG. 4) to expand the seat belt to its original condition. When the occupant leaves the vehicle, the spring 68 causes the seat to return to its FIGS. 1 and 4 position.

I claim:

1. A safety seat belt system for an automotive vehicle having a seat and having an electrical system, the seat belt system comprising:
   an arcuate, semi-rigid seat belt having first and second ends;
   the belt being hinged at one of said ends in a housing structure;
   means in said housing structure to bias the belt in a position across said seat;
   latch means at the other end of the belt to releasably engage the belt in restraining position; and
   means for automatically adjusting the length of the belt upon engagement of the latch.
2. The invention of claim 1, and:
   means responsive to contact of the belt with the wearer to deactivate the means for automatic adjustment.
3. The invention of claim 1, wherein:
   the housing structure includes a first housing and a second housing;
   the first and second housings being pivoted together on a hinge; and
   spring means having spring portions extended into each of the housings to constantly urge at least one thereof to said position.
4. The invention of claim 1, wherein:
   the latch means is controlled by the vehicle electrical system.
5. The invention of claim 1, wherein:
   the belt includes a main body comprising a rod;
   said other end of the belt comprises a sleeve telescopically engaged over the rod and having a magnet member therein;
   a cable attached to the sleeve and to the rod; and
   means activated by the magnet to exert an inward force on the cable to draw the rod into the sleeve.
6. The invention of claim 5, wherein:
   the last named means comprises a gear and pulley system.
7. The invention of claim 6, and:
   the gear and pulley system including a ratchet; and
   a pawl engaged with the ratchet upon actuation of the system to prevent withdrawal of the rod from the sleeve.
8. The invention of claim 2, wherein:
   said means to deactivate the system comprises a sensor spring;
   the sensor spring having a pawl thereon;
   a gear and pulley system, including a ratchet, for adjusting the belt; and
   the pawl engaging the ratchet upon contact of the sensor with the wearer.
9. The invention of claim 7, wherein:
   the magnet member is activated by the vehicle electrical system; and a switch for said system.
10. The invention of claim 9, and:
    a delay system in said electrical system.

* * * * *